(12) United States Patent
Lamperth

(10) Patent No.: US 8,008,817 B2
(45) Date of Patent: Aug. 30, 2011

(54) WHEEL-MOUNTED ELECTRICAL MACHINE

(75) Inventor: Michael Ulrich Lamperth, Woking (GB)

(73) Assignee: EVO Electric Ltd., London (GB)

( * ) Notice: Subject to any disclaimer, the term of this patent is extended or adjusted under 35 U.S.C. 154(b) by 51 days.

(21) Appl. No.: 12/349,330

(22) Filed: Jan. 6, 2009

(65) Prior Publication Data

US 2009/0273249 A1 Nov. 5, 2009

Related U.S. Application Data

(63) Continuation of application No. PCT/GB2007/002554, filed on Jul. 9, 2007.

(51) Int. Cl.
*H02K 7/10* (2006.01)
(52) U.S. Cl. .......................... 310/77; 310/268
(58) Field of Classification Search .............. 310/76–78, 310/89–90, 268, 75 C, 93
See application file for complete search history.

(56) References Cited

U.S. PATENT DOCUMENTS

| | | | | |
|---|---|---|---|---|
| 4,609,080 A * | 9/1986 | Sekella | ................... | 188/171 |
| 5,057,728 A * | 10/1991 | Dammeyer et al. | ............. | 310/77 |
| 5,121,018 A * | 6/1992 | Oldakowski | ................... | 310/77 |
| 5,274,290 A * | 12/1993 | Fischer | ........................... | 310/93 |
| 5,739,605 A * | 4/1998 | Lazorchak | ...................... | 310/78 |
| 5,982,063 A * | 11/1999 | Lutz et al. | ....................... | 310/77 |
| 6,046,518 A | 4/2000 | Williams | | |
| 6,892,841 B2 * | 5/2005 | Makuta et al. | ............ | 180/65.51 |
| 7,017,694 B2 * | 3/2006 | Shirazawa | ................ | 180/65.51 |
| 7,612,477 B2 * | 11/2009 | Abe et al. | ....................... | 310/90 |
| 7,730,983 B2 * | 6/2010 | Tanaka et al. | ........... | 180/65.285 |
| 2003/0189380 A1 * | 10/2003 | Ishikawa et al. | ............... | 310/77 |
| 2004/0063536 A1 | 4/2004 | Atarashi | | |
| 2008/0191567 A1 * | 8/2008 | Abe et al. | ....................... | 310/77 |

FOREIGN PATENT DOCUMENTS

| | | |
|---|---|---|
| DE | 4125044 A1 | 2/1993 |
| DE | 19706585 A1 | 8/1998 |
| DE | 10226341 A1 | 12/2003 |
| EP | 1270395 A | 1/2003 |
| GB | 0613570.1 | 1/2008 |
| WO | 96/21965 A | 7/1996 |

OTHER PUBLICATIONS

Hredzak B, et al.; "Design of a Novel Multi-Drive System with Reduced Torque Pulsations for an Electric Vehicle", 2000 IEEE Power Engineering Society; Winter Mtg; Singapore, Jan. 23-27, 2000; vol. 1 of 4, p. 208-212.
International Search Report; PCT/GB2007/002554; published Jan. 10, 2008.

* cited by examiner

*Primary Examiner* — Thanh Lam
(74) *Attorney, Agent, or Firm* — Novak Druce + Quigg LLP

(57) ABSTRACT

A hybrid-electric vehicle is provided having a respective electrical machine in each wheel thereof. Each electrical machine is of the axial-flux type, having a rotor sandwiched axially between two parts of a stator. Each electrical machine is fitted to the respective wheel such that the rotor takes the place of a disc of a disc brake system, and the stator is mounted in place of a calliper of the disc brake system.

2 Claims, 9 Drawing Sheets

WHEEL-MOUNTED ELECTRICAL MACHINE

CROSS-REFERENCE TO RELATED APPLICATIONS

The present application is a continuation of International Application No. PCT/GB2007/002554, filed Jul. 9, 2007, which was published in English pursuant to Article 21(2) of the Patent Cooperation Treaty, and which claims priority to: GB 0613570.1, filed Jul. 7, 2006; GB 0709516.9, filed May 17, 2007; GB 0709628.2, filed May 18, 2007. Said applications are expressly incorporated herein by reference in their entireties.

TECHNICAL FIELD

This disclosure relates to a wheel-mounted electrical machine, a wheel mounting assembly for a vehicle, and a vehicle.

BACKGROUND

Automotive vehicles, such as passenger cars (sometimes referred to as "automobiles") are often criticised for producing emissions that are harmful to humans and the environment. There is therefore increasing interest in automotive vehicles with reduced emissions and with greater fuel efficiency, such as electric and hybrid-electric vehicles.

One problem that affects hybrid-electric vehicles is the problem of accommodating the electrical components, such as the electrical motor used to power the vehicle, in the vehicle. The accommodation of components in vehicles is sometimes referred to as "packaging." The electrical components in hybrid-electric vehicles must be positioned in a way that is operationally effective and that does not interfere with other components of the vehicle. Ideally, the electrical components should also be positioned so as not to intrude into the passenger space of the vehicle. As many hybrid-electric vehicles are adaptations of solely fossil fuel-powered vehicles—for example, the chassis, body, suspension and certain driveline components can be retained—it is necessary to fit the additional electrical components around the existing components of the vehicle without interfering with the operation of those components. This can be difficult and can lead to great complexity in hybrid-electric vehicles, particularly in relation to driveline components.

Similar problems affect electric vehicles.

An object of this disclosure is to address these problems.

SUMMARY

According to a first aspect of this disclosure, there is provided a wheel-mounted electrical machine for powering a vehicle, the electrical machine including at least one rotor and at least one stator, the stator mounted on structure adjacent the wheel and the rotor drivingly connected to the wheel to drive the wheel relative to the stator.

The rotor can be mounted around an axle of the wheel and coupled thereto so as to drive the axle and hence the wheel. The rotor can be mounted to a hub of the wheel and coupled thereto so as to drive the hub and hence the wheel. The rotor can be mounted in place of a rotating component of a brake. The rotor can be mounted in place of a disc of a disc brake. The rotor can be mounted in place of a drum of a drum brake.

The stator can be mounted to structure of the suspension system adjacent the wheel. The stator can be mounted to an upright of the suspension system. The stator can be mounted in place of a stationary component of a brake. The stator can be mounted in place of a brake calliper of a disc brake. The stator can be mounted in place of brake shoes and pistons of a drum brake.

By mounting the rotor of the electrical machine in place of the disc of a disc brake, and the stator in place of the calliper of a disc brake, embodiments of the disclosure can adapt an existing vehicle, or components thereof, to use as or in an electric or hybrid-electric vehicle with minimum adaptation thereof.

The rotor can be drivingly connected to the wheel via a gear train. The gear train can include an epicyclic gear train. A first component of the epicyclic gear train can be coupled to the rotor; a second component of the epicyclic gear train can be coupled to the wheel; and a third component of the epicyclic gear train can be coupled to the stator. The coupling can be by direct connecting. The coupling can be via intermediate structure or an intermediate component or components. For example, the third component can be mounted to the structure to which the stator is mounted. The rotor can be coupled to a sun gear of the epicyclic gear train; the wheel can be connected to an arrangement of planet gears of the epicyclic gear train; the stator can be coupled to an annulus of the epicyclic gear train.

The electrical machine can be an axial flux electrical machine. It can be a radial flux electrical machine. The axial flux electrical machine can have a rotor sandwiched between each of two portions of the stator. The rotor can have permanent magnets thereon or therein. The stator can include one or more electrical windings thereon or therein, arranged to set up a magnetic field. The axial flux electrical machine can include plural ones of the rotor. Each rotor can be axially spaced from the or each other rotor. Each rotor can be concentric with the or each other rotor. Where there are plural ones of the rotor, each rotor can be sandwiched between two stator portions. There can be only one stator portion between juxtaposed ones of the rotors.

The electrical machine can include a brake. The brake can operate on the rotor to slow the rotor. The brake can operate on the rotor to slow the rotor by friction. The brake can press brake pads into contact with the rotor. The brake can be a disc brake with the rotor, or at least part thereof, serving as the disc of the disc brake. The electrical machine can include a brake calliper. The calliper can be mounted on the stator. The calliper can be mounted with the stator on the structure adjacent the wheel.

The brake can be axially spaced from the rotor. The brake can include a brake disc coaxial with the electrical machine. The brake disc can also be drivingly connected to the wheel.

Cooling means can be provided adjacent the stator in order to remove heat generated by the stator. The cooling means can be provided in structure of the stator. The cooling means can include one or more heat exchangers arranged to remove heat from the stator. The cooling means can include fluid-carrying channels provided in structure of the stator. The cooling means can include structure arranged to add to the exposed surface area of the stator. The cooling means can include one or more cooing fins.

According to another aspect of this disclosure, there is provided a wheel mounting assembly for a vehicle, the assembly including a wheel-bearing housing structure arranged to accommodate a wheel bearing and arranged for fixing to suspension components of the vehicle; a hub arranged for rotatable mounting relative to the wheel-bearing housing structure; the assembly further including an electrical machine including at least one rotor and at least one stator, the stator mounted on the wheel-bearing housing structure and the rotor mounted on the hub.

According to a further aspect of this disclosure, there is provided a wheel mounting assembly for a vehicle, the assembly including a wheel-bearing housing structure arranged to accommodate a wheel bearing and arranged for fixing to suspension components of the vehicle; a wheel rotatably mounted relative to the wheel-bearing housing structure; the assembly further including the electrical machine of the first aspect of the disclosure, the stator of the electrical machine mounted on the wheel-bearing housing structure and the rotor drivingly connected to the wheel to drive the wheel relative to the stator and hence the wheel-bearing housing structure.

Optional features of the first aspect of the disclosure can be optional features of the other and further aspects of the disclosure.

According to a still further aspect of this disclosure, there is provided a vehicle including the wheel-mounted electrical machine of the first aspect and/or the wheel mounting assembly of the other aspect and/or the wheel mounting assembly of the further aspect.

The vehicle can be arranged controllably to supply electrical power to the electrical machine in order to operate the electrical machine as a motor and thereby drive the vehicle. The vehicle can be arranged to operate the electrical machine as a generator and to store electrical energy generated thereby for use later in operating the electrical machine as a motor to drive the vehicle.

The vehicle can include a respective one of the wheel-mounted electrical machine of the first aspect and/or the wheel mounting assembly of the other aspect and/or the wheel mounting assembly of the further aspect at each of two, more or all wheels of the vehicle.

SPECIFIC DESCRIPTION OF CERTAIN EXEMPLARY EMBODIMENTS

Figure 1:
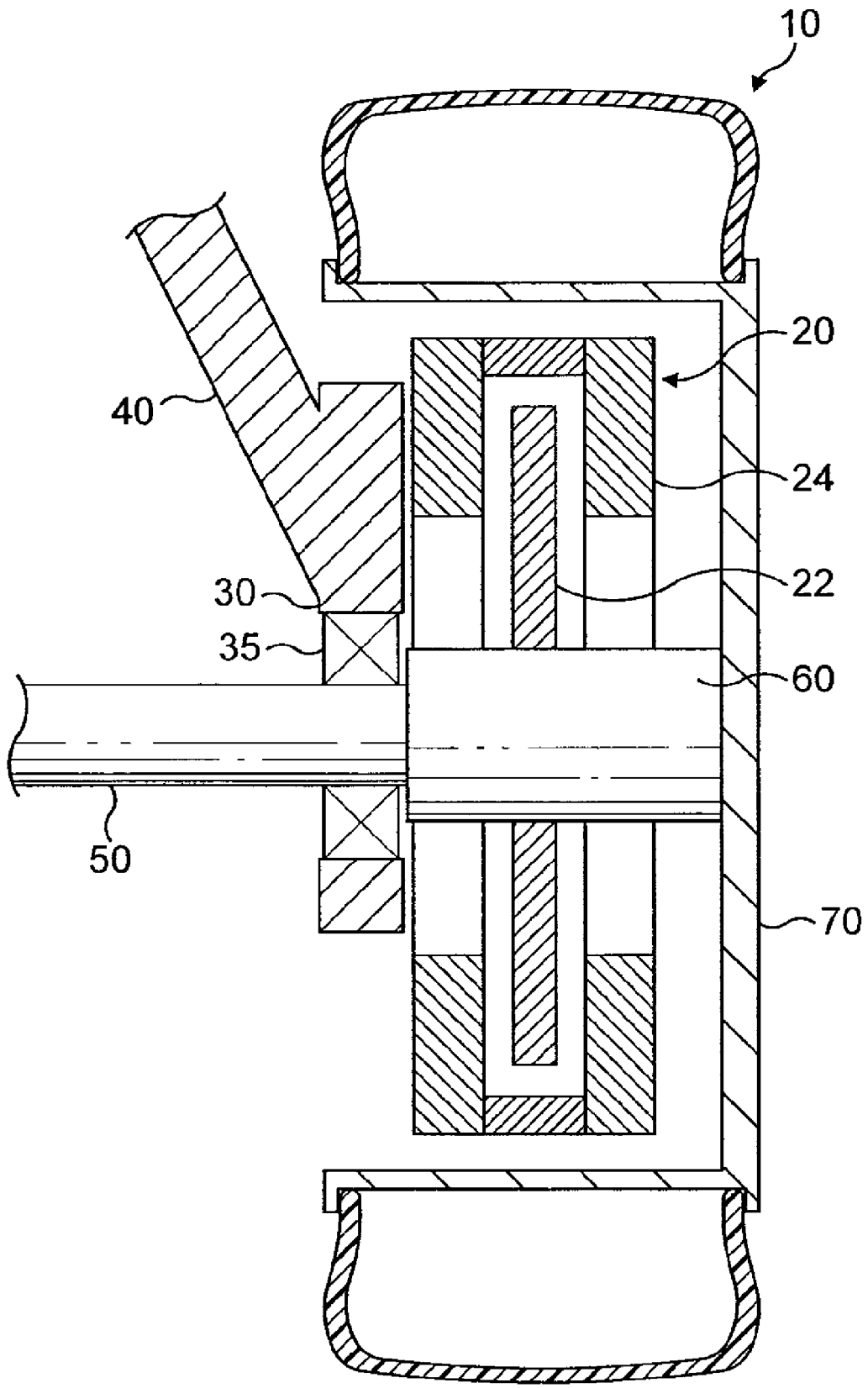
FIG. 1 is a diagrammatic sectional view of a first embodiment in which an electrical machine having a single rotor is mounted in a wheel of a vehicle, on a hub thereof, the section being through a vertical axial plane.

In a first embodiment of this disclosure, there is provided a hybrid-electric vehicle, only part 10 of which his shown in FIG. 1. The vehicle is a car with four wheels. Each of the wheels has a respective electrical machine 20 mounted therein. The hybrid-electric vehicle is of the type in which an internal combustion engine is mechanically coupled to a generator to drive the generator and thereby generate electricity for operating the electrical machines 20 and thereby driving the car. The arrangement of an exemplary one 20 of the electrical machines is described in more detail below, it being understood that the arrangement of each of the other electrical machines is substantially the same.

The part 10 of the vehicle shown in FIG. 1 includes a wheel bearing housing 30 with a suspension strut 40 attached thereto. The wheel bearing housing 30 houses a wheel bearing 35. A drive shaft 50 is supported in the wheel bearing 35 and extends from an inner side of the bearing 35 that faces towards the centre of the car through the bearing 35 to emerge at the outer side thereof, facing away from the car. A wheel hub 60 is mounted on the driveshaft 50 on the outer side thereof. A wheel 70 is similarly mounted on the wheel hub 60. Thus, save for the presence of the electrical machine 20, the assembly of the wheel bearing housing 30, the wheel bearing 35, the drive shaft 50, the hub 60 and the wheel 70 is conventional.

As is shown in FIG. 1, the electrical machine 20 is an axial flux electrical machine. It has a rotor 22 and a stator 24. The rotor 22 in the form of disc, with a circumferentially-distributed series of permanent magnets (not shown) arranged thereon. The rotor 22 is positioned between two halves of the stator 24, such that the rotor 22 is axially sandwiched therebetween. The stator 24 includes a stator winding (not shown) arranged to set up a magnetic field when an electrical current exists therein. The electrical machine 20 can be operated as both a motor and a generator.

An appropriate electrical machine for use as the electrical machine 20 in this embodiment would be that described in UK Patent Application No. 0613570.1, the contents of which are hereby incorporated herein in their entirety.

With continued reference to FIG. 1, the electrical machine 20 is fitted to the vehicle in place of a disc brake. The rotor 22 is fitted to the wheel hub 60 in the way that a disc of a disc brake would be fitted thereto. Similarly, the stator 24 is mounted on the wheel bearing housing 30 in the way that a brake calliper of a disc brake would be fitted thereto. Thus, the electrical machine can be fitted in substitution of a disc brake to a vehicle that is arranged to have disc brakes fitted thereto.

In operation, the electrical machines 20 can be operated as motors to provide rotary power to the wheels 70 to thereby drive the wheels 70 and accelerate the car. The electrical machines 20 can also be operated as generators to resist motion of the wheels and thereby slow the car. Electricity generated in this way can be stored for later use in operating the electrical machines 20 as motors. Thus, the electrical machines 20 can be used in regenerative braking.

In a modification of the embodiment described above with reference to FIG. 1, the drive shaft is coupled to a mechanical driveline system (not shown) that is arranged to receive rotary power from an internal combustion engine. In such a modification, the electrical machines 20 can be used to supplement the power supplied from the internal combustion engine via the mechanical driveline system.

Figure 2:
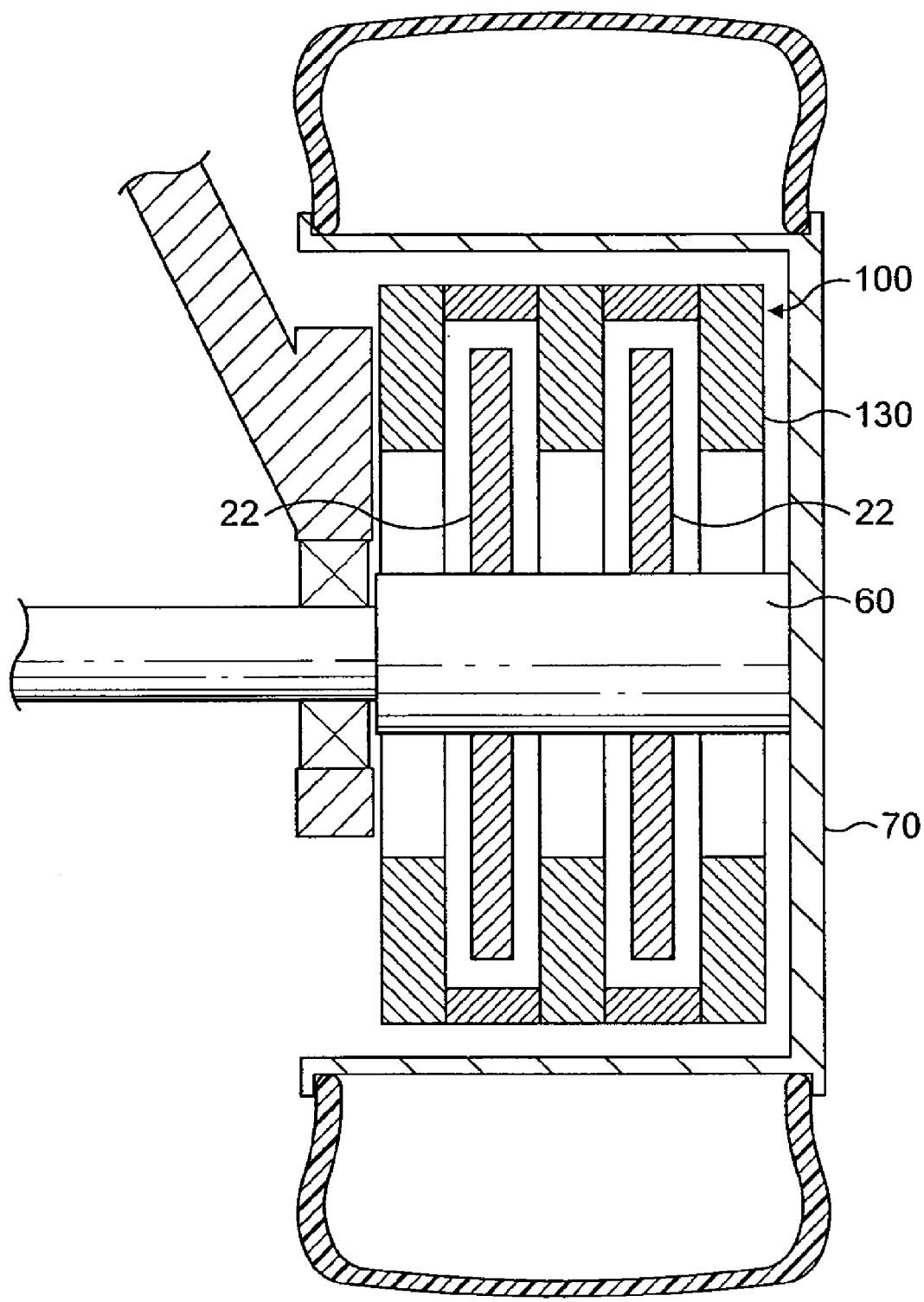
FIG. 2 is a diagrammatic sectional view of a second embodiment, similar to the first embodiment, but in which the electrical machine has two rotors.

FIG. 2 shows a second embodiment that is similar to the first embodiment shown in, and described above with reference to, FIG. 1. The same reference numerals are therefore used in the description of this embodiment to identify components that this embodiment shares with the first embodiment described above with reference to FIG. 1.

This embodiment differs from the first embodiment in providing a modified electrical machine 100 in each wheel 70. The modified electrical machine 100 is similar to the electrical machine 20 described above with reference to FIG. 1, but differs in having two rotors 22 mounted to the hub 60 and axially spaced from one another. The stator 130 differs in having three stator portions, such that each of the rotors 22 is sandwiched between two of the stator portions. In other respects, this second embodiment is the same as the first.

By providing the modified electrical machine 120 with two rotors 22 each sandwiched between portions of the stator 130, the modified electrical machine 120 is able to generate more torque, both when being operated as a motor and a generator. Accordingly, the second embodiment is suited to applications where the hybrid-electric vehicle is a vehicle with large mass, such as a bus.

Figure 3:
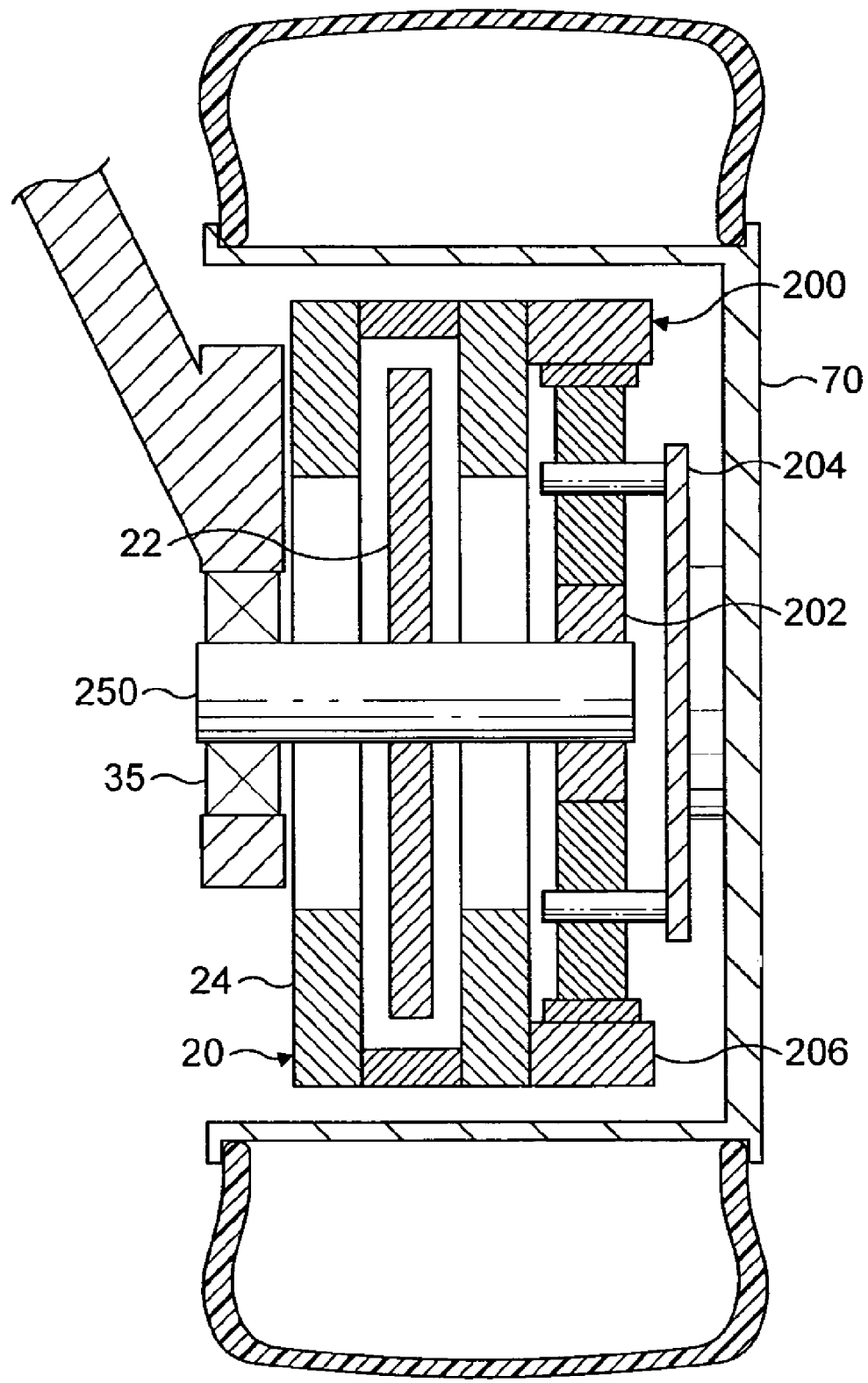
FIG. 3 is a diagrammatic sectional view of a third embodiment, similar to the first embodiment, but in which an epicyclic gear train is provided between components of the electrical machine and the wheel.

FIG. 3 shows a third embodiment that is similar to the first embodiment shown in, and described above with reference to, FIG. 1. The same reference numerals are therefore used in the description of this embodiment to identify components that this embodiment shares with the first embodiment described above with reference to FIG. 1.

This third embodiment differs from the first embodiment in providing an epicyclic gear train 200 between the wheel 70 and the electrical machine 20. This and other modifications are described below.

As in the first embodiment, the wheel-bearing housing 30 includes the wheel bearing 35 therein. There is, however, no drive shaft 50. Instead a short axle 250 is provided and is journalled in the bearing 35. The axle 250 extends from the bearing 35 only to the outer side thereof. The rotor 22 of the electrical machine 20 is mounted on the axle 250. The end of the axle 250 that is remote from the bearing 35 has a sun gear 202 of the epicyclic gear train 200 mounted thereon. A planetary gear arrangement 204 of the epicyclic gear train 200 is fixed to the wheel 70. An annulus 206 of the epicyclic gear train 200 is fixed to the stator 24 of the electrical machine.

In other respects, this third embodiment is similar to the first.

By providing an epicyclic gear train between electrical machine 20 and the wheel 70, the torque generated by the electrical machine 20 is increased as it is transmitted to the wheel 70.

Figure 4:
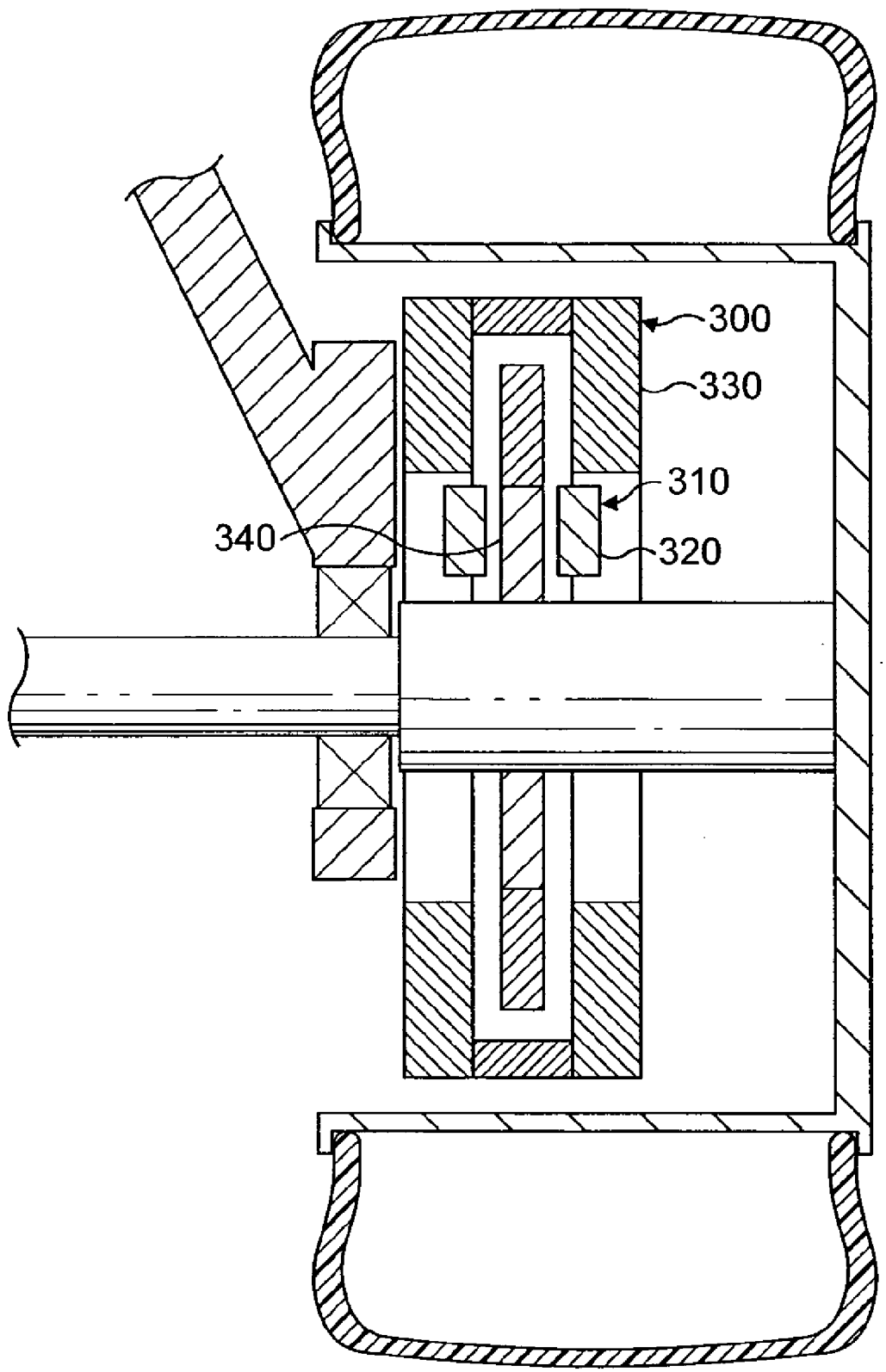
FIG. 4 is a diagrammatic sectional view of a fourth embodiment, similar to the first embodiment, but in which a brake is provided that acts axially on the rotor of the electrical machine.

FIG. 4 shows a fourth embodiment that is similar to the first embodiment shown in, and described above with reference to, FIG. 1. The same reference numerals are therefore used in the description of this embodiment to identify components that this embodiment shares with the first embodiment described above with reference to FIG. 1.

This fourth embodiment differs from the first embodiment in that the electrical machine 300 of this embodiment is modified to include a disc brake 310. The disc brake 310 has a calliper 320 that is mounted to the stator 330 of the electrical machine 300 so as to sandwich the rotor 340 between portions of the calliper 320. In certain embodiments a housing of the calliper 320 can be integrally formed with structure of the stator 330. The disc brake 310 is arranged to press brake pads (not shown) against the surfaces of the rotor 340, radially inside the magnets mounted thereon. Thus, the rotor 340 acts as a disc of the disc brake 300.

When operated in this way, the disc brake 300 is used in combination with regenerative braking to slow the vehicle. Alternatively, the disc brake 300 is used as a back-up system in the event that regenerative braking fails or fails to slow the vehicle sufficiently quickly.

In other respects, this fourth embodiment is similar to the first.

Figure 5:
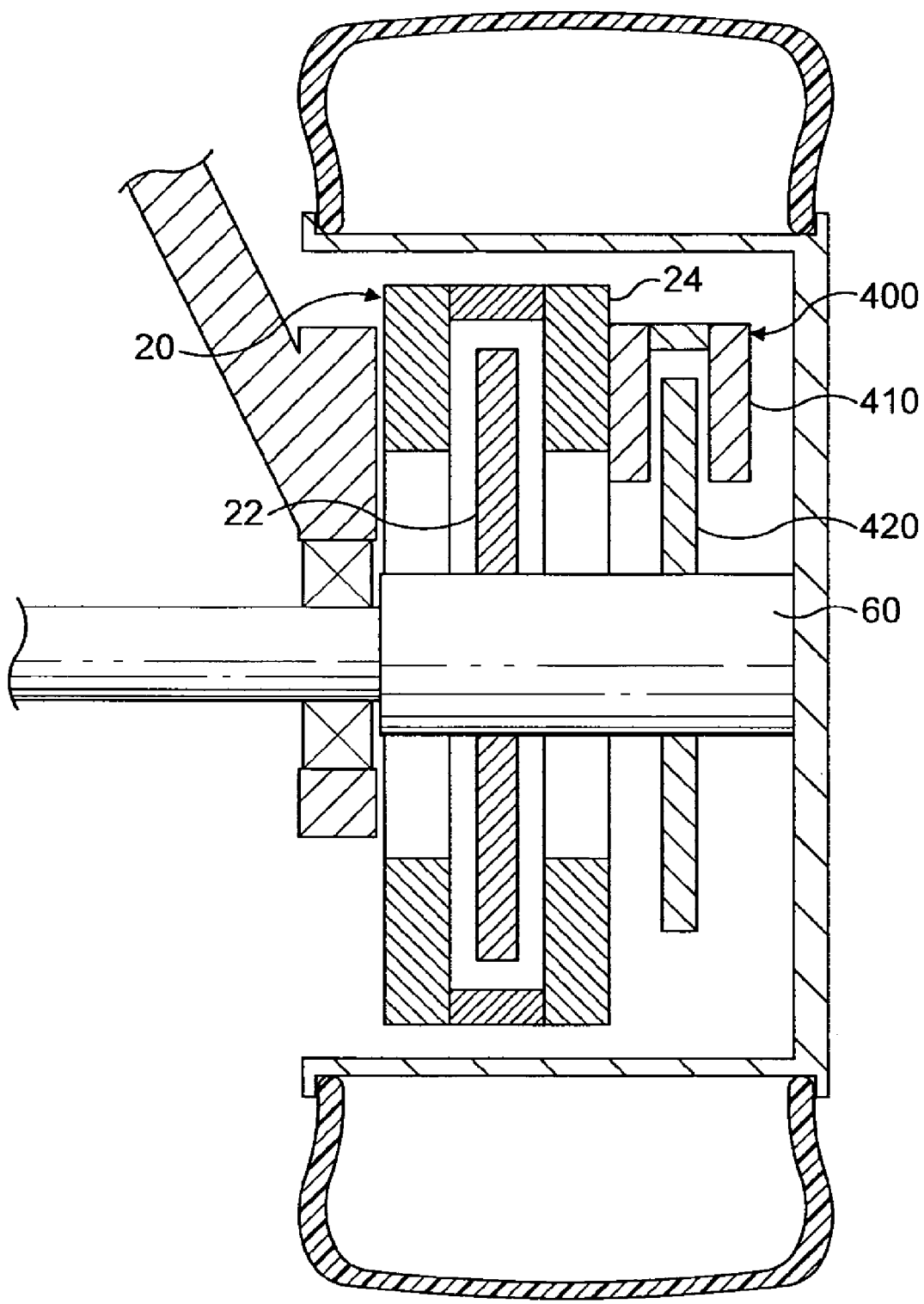
FIG. 5 is a diagrammatic sectional view of a fifth embodiment, similar to the first embodiment, but in which a brake is provided that acts on a disc coaxial with and axially spaced from the electrical machine.

FIG. 5 shows a fifth embodiment that is similar to the first embodiment shown in, and described above with reference to, FIG. 1. The same reference numerals are therefore used in the description of this embodiment to identify components that this embodiment shares with the first embodiment described above with reference to FIG. 1.

This fifth embodiment differs from the first embodiment in including a disc brake 400. Thus, there are similarities with the fourth embodiment described above with reference to FIG. 4. However, in this fifth embodiment, the electrical machine 20 is unmodified and the disc brake 400 is axially displaced from the rotor 22 and the stator 24 thereof. More specifically, the disc brake 400 includes a calliper 410 and a disc 420. The calliper 410 is fixed to structure of the stator 24 so as to be axially adjacent thereto, on the outside thereof. The disc 420 is coaxially mounted with the rotor 22 on the hub 60 so as to be sandwiched between structure of the calliper 410. The calliper 410 is arranged to press brake pads (not shown) against the surfaces of the disc 420 in the conventional manner of disc brakes.

When operated in this way, the disc brake 400 can be used in combination with regenerative braking to slow the vehicle. Alternatively, the disc brake 400 can be used as a back-up system in the event that regenerative braking fails or fails to slow the vehicle sufficiently quickly.

In other respects, this fifth embodiment is similar to the first.

Figure 6:
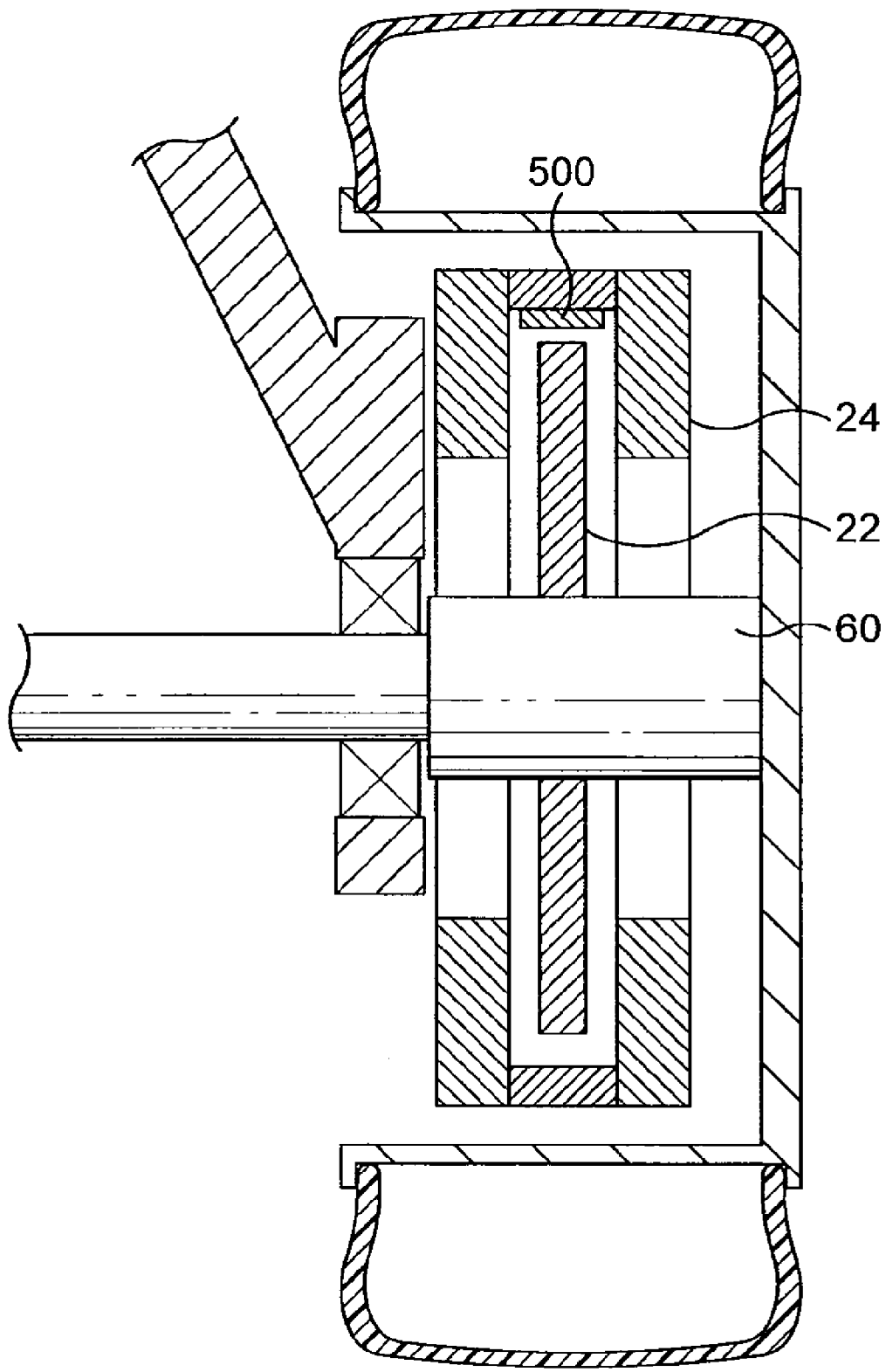
FIG. 6 is a diagrammatic sectional view of a sixth embodiment, similar to the first embodiment, but in which a brake is provided that acts radially on the rotor of the electrical machine.

FIG. 6 shows a sixth embodiment that is similar to the first embodiment shown in, and described above with reference to, FIG. 1. The same reference numerals are therefore used in the description of this embodiment to identify components that this embodiment shares with the first embodiment described above with reference to FIG. 1.

Figure 7:
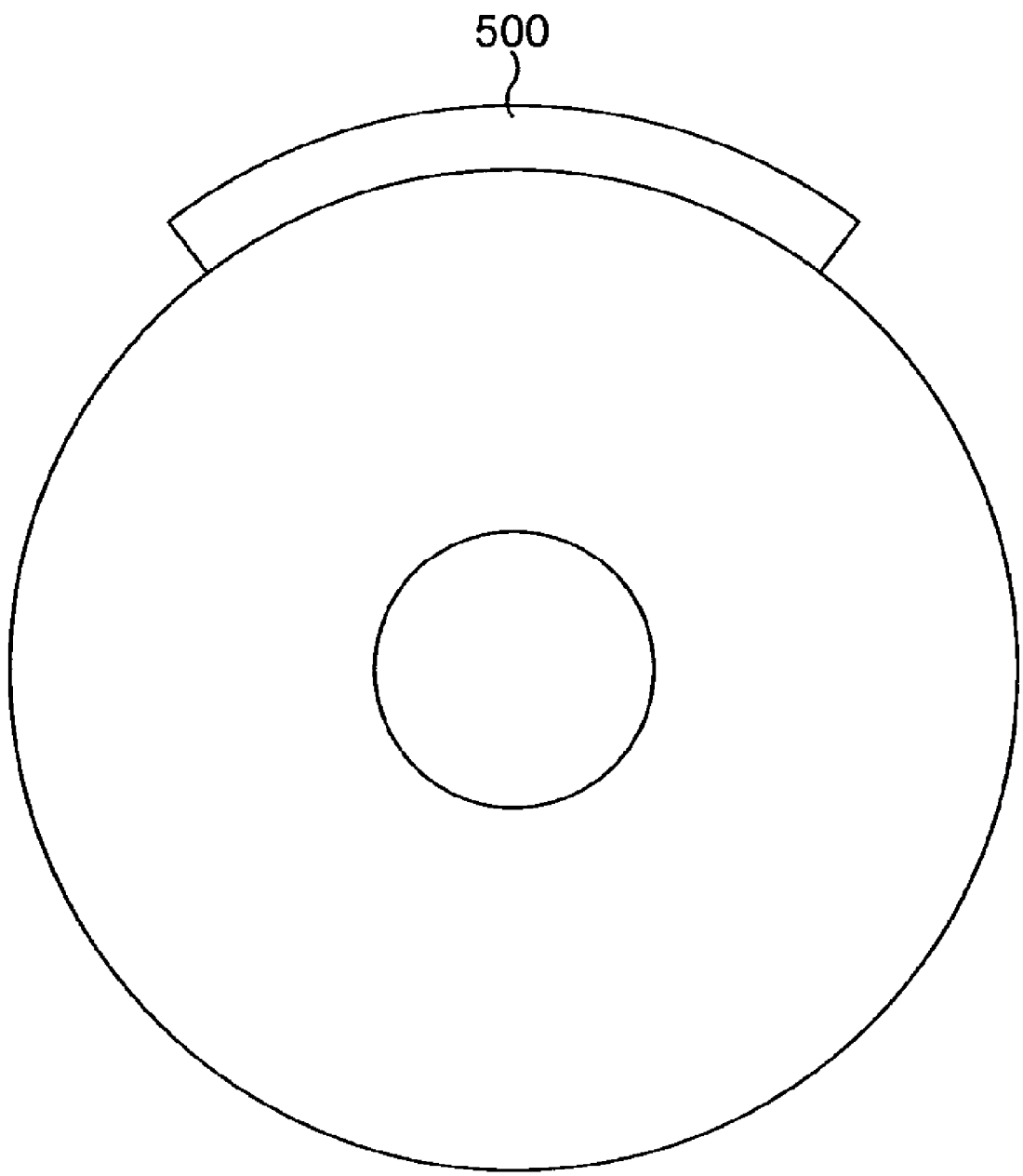
FIG. 7 is a diagrammatic elevation view of the rotor and part of the brake of the sixth embodiment.

This sixth embodiment differs from the first embodiment in including a brake shoe arrangement 500. The brake shoe arrangement 500 is mounted between the two parts of the stator 24 so as to extend around a circumferential section of the rim of the rotor 22. The brake shoe arrangement 500 is arranged to press a brake shoe radially against the rim of the rotor 22. FIG. 7 shoes the brake shoe engaging the rim of the rotor 22 in this way. It will be understood that the brake shoe operates rather like a brake shoe of a drum brake, but differs in engaging a rim of a disc located radially inside the shoe, rather than the inner wall of a drum located radially outside the shoe.

When used in this way, the brake shoe arrangement 500 can be used in combination with regenerative braking to slow the vehicle. Alternatively, the brake shoe arrangement 500 can be used as a back-up system in the event that regenerative braking fails or fails to slow the vehicle sufficiently quickly.

In other respects, this sixth embodiment is the similar to the first.

Figure 8:
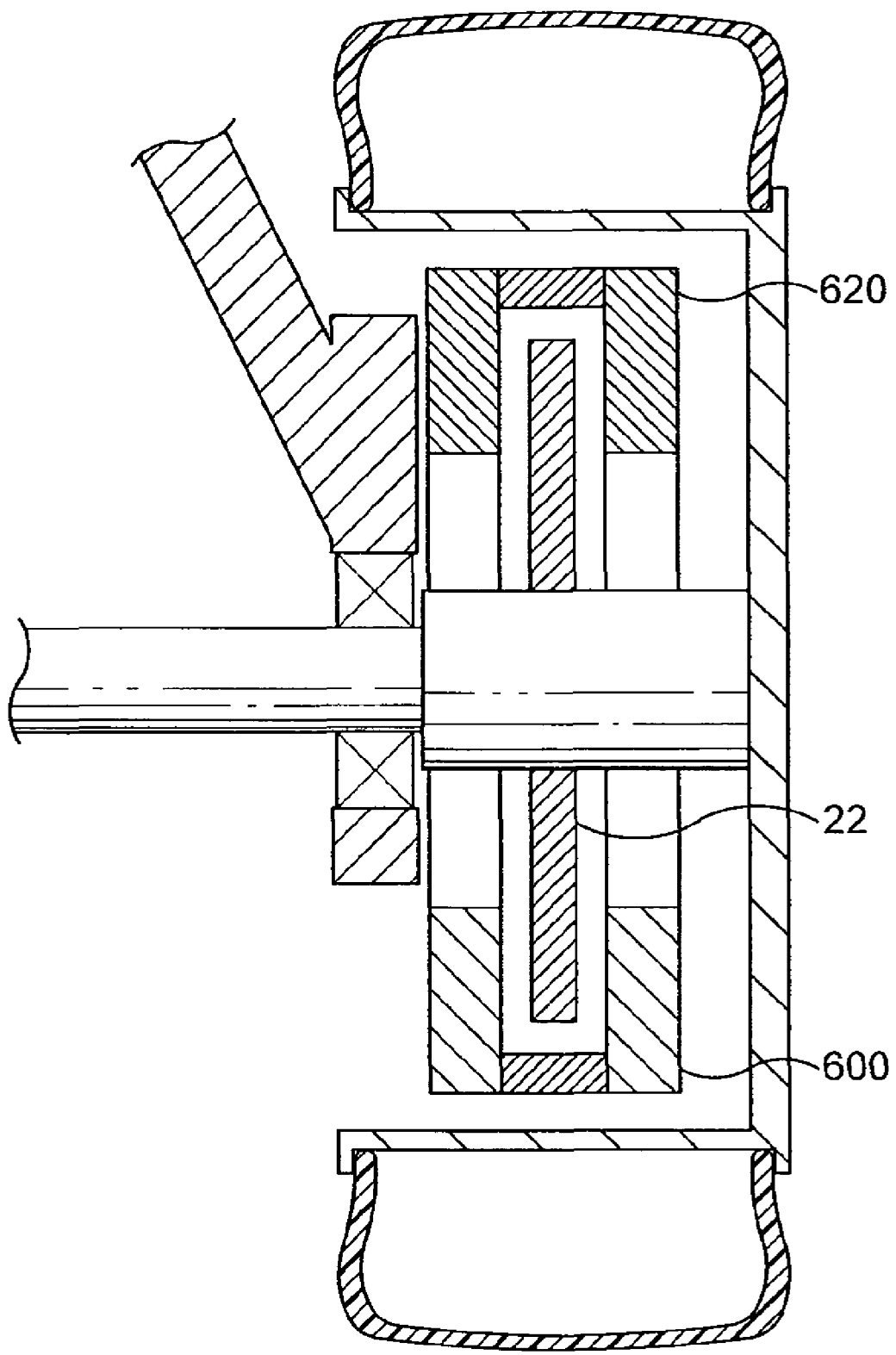
FIG. 8 is a diagrammatic sectional view of a seventh embodiment, similar to the first embodiment, but in which a brake is provided that acts axially on a segment rotor of the electrical machine, the brake replacing a segment of the stator of the electrical machine.

FIG. 8 shows a seventh embodiment that is similar to the first embodiment shown in, and described above with reference to, FIG. 1. The same reference numerals are therefore used in the description of this embodiment to identify components that this embodiment shares with the first embodiment described above with reference to FIG. 1.

This seventh embodiment differs from the first embodiment in including a disc brake arrangement that includes a brake calliper 600. This embodiment is therefore somewhat similar to others of the embodiments described above. However, this embodiment differs in that the brake calliper 600 replaces part of the stator of the electrical machine. Thus, this embodiment includes a revised stator 620 that is similar to that 24 described above with reference to FIG. 1. The revised stator 620 is similar in being formed of two parts with the rotor 22 therebetween, but differs in that an axially-opposite segment of each part of the FIG. 1 stator 24 is removed and replaced by the brake calliper 600 to form the revised stator 620. The brake calliper 600 is sized to fit in the segment removed from the FIG. 1 stator 24 and is arranged to be mounted to adjacent structure of the revised stator 620. The brake calliper 600 is further arranged to apply brake pads (not shown) to each surface of the rotor 22.

Figure 9:
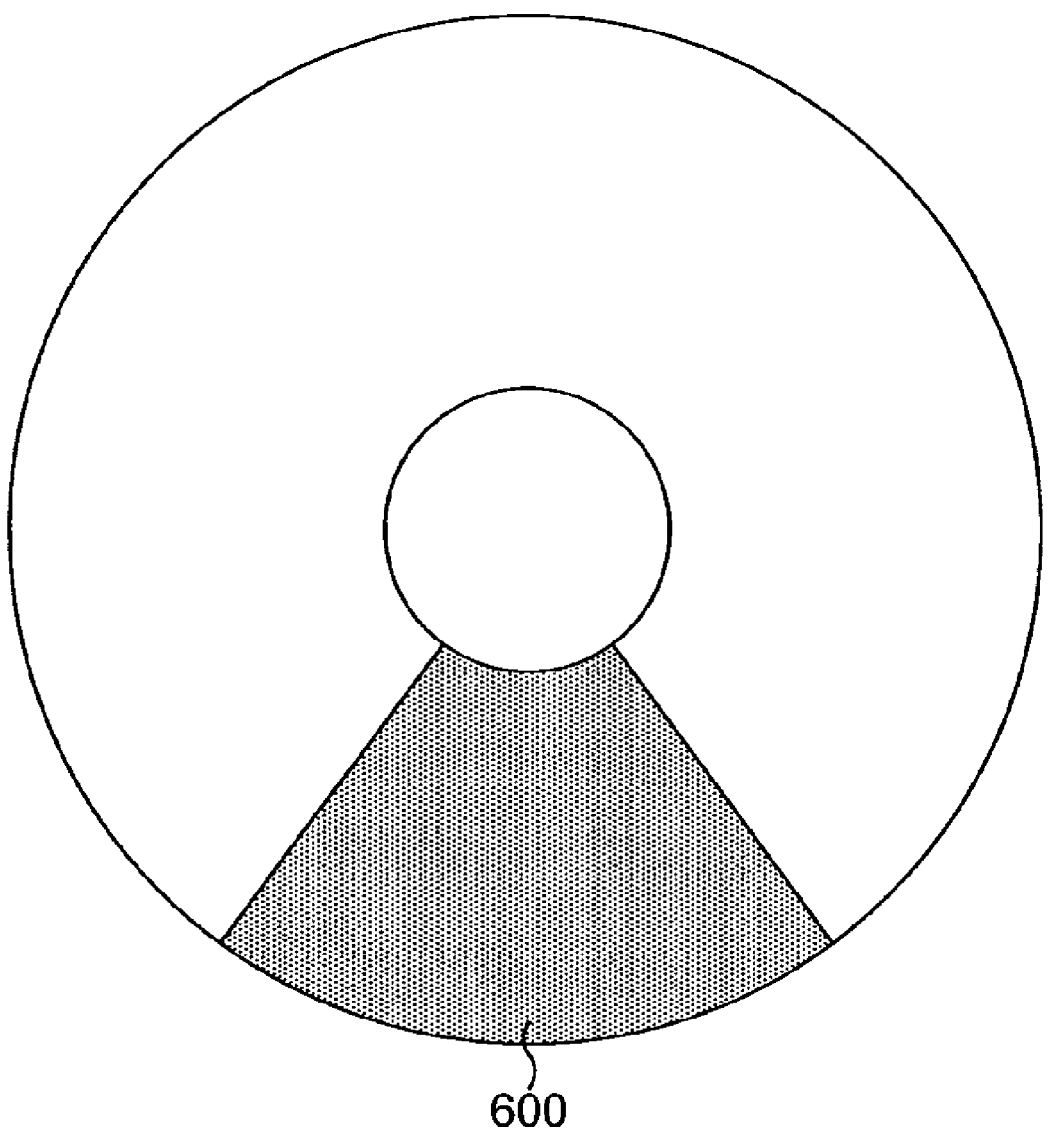
FIG. 9 is a diagrammatic elevation view of the stator and part of the brake of the seventh embodiment.

FIG. 9 shows the brake calliper 600 mounted in position on the revised stator 620.

In use, the brake 600 can be used in combination with regenerative braking to slow the vehicle. Alternatively, the brake 600 can be used as a back-up system in the event that regenerative braking fails or fails to slow the vehicle sufficiently quickly.

In other respects, this seventh embodiment is the similar to the first.

One of more of the components of the electrical machines described above can be as, or can include features of, corresponding components of the electrical machine described in UK Patent Application No. 0613570.1, the contents of which are incorporated herein by reference.

The invention claimed is:

1. An axial-flux electrical machine for powering a vehicle, the electrical machine comprising at least one rotor and at least one stator, wherein each such stator includes means for mounting on, and for engagement with, structure of a vehicle in place of a disc brake calliper, and wherein the rotor includes means for mounting on, and for engagement with, a rotatable hub of such a vehicle in place of a brake disc, such that, in use, the rotor is drivingly connected to the hub to drive the hub relative to the stator.

2. A vehicle comprising:
 a wheel-bearing housing structure arranged to accommodate a wheel bearing and arranged for fixing to suspension components of the vehicle; and
 a wheel rotatably mounted relative to the wheel-bearing housing structure;
 an axial-flux electrical machine comprising
  at least one rotor and at least one stator, wherein each such stator includes means for mounting on, and for engagement with, a structure of a vehicle in place of a disc brake calliper, and wherein the rotor includes means for mounting on, and for engagement with, a rotatable hub of such a vehicle in place of a brake disc, such that, in use, the rotor is drivingly connected to the hub to drive the hub relative to the stator.

* * * * *